May 1, 1962 T. E. KIRK 3,032,697
MOTOR CONTROL CIRCUIT
Filed Dec. 8, 1959
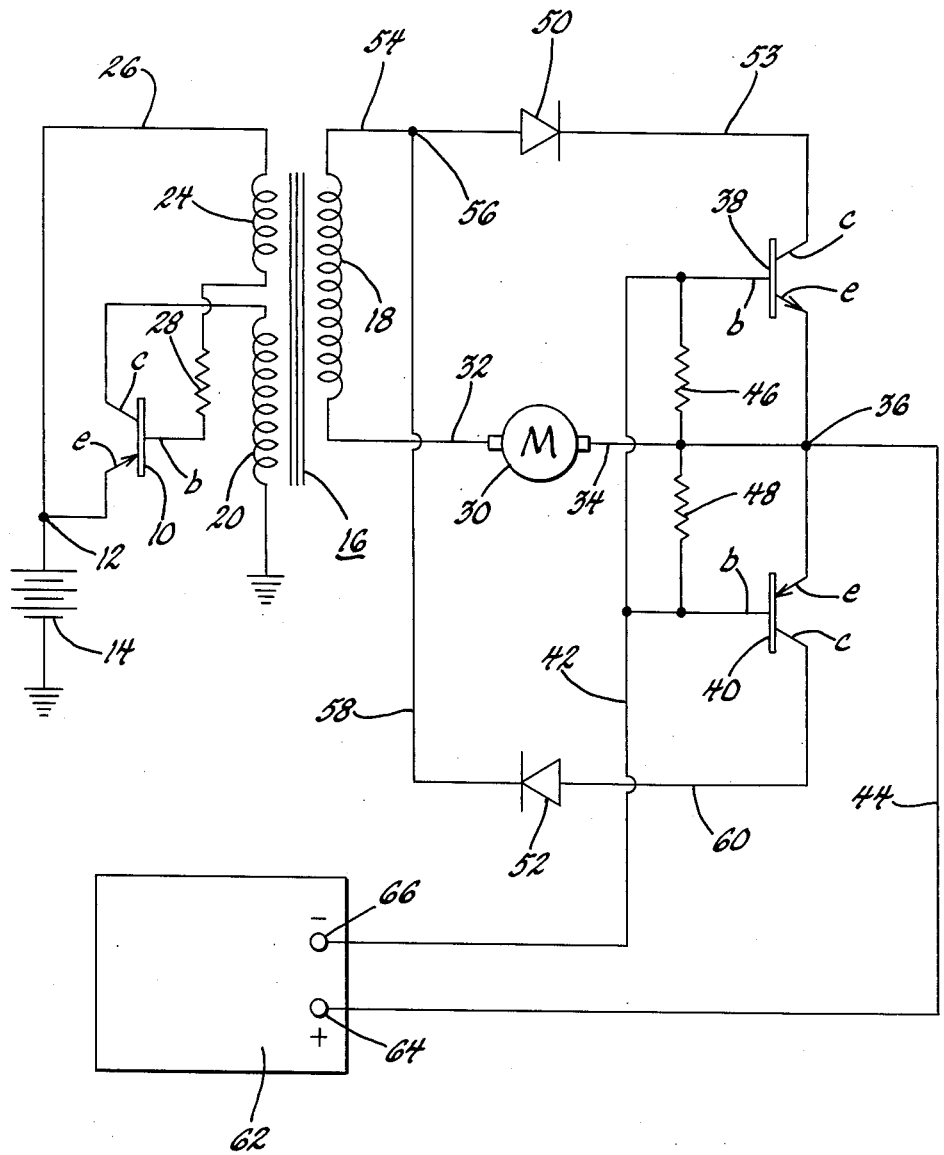
INVENTOR.
Thomas E. Kirk
BY
C. R. Meland
HIS ATTORNEY

United States Patent Office 3,032,697
Patented May 1, 1962

3,032,697
MOTOR CONTROL CIRCUIT
Thomas E. Kirk, Anderson, Ind., assignor to General Motors Corporation, Detroit, Mich., a corporation of Delaware
Filed Dec. 8, 1959, Ser. No. 858,260
5 Claims. (Cl. 318—293)

This invention relates to a bidirectional motor control circuit for controlling the direction of rotation of a direct current motor in response to an input signal.

In temperature control systems and the like for motor vehicles it is at times required to operate an electrical device in two directions in response to an input signal. As an example, it may be required to control the amount of heating or cooling of a vehicle passenger compartment by a bidirectional device that controls the amount of heating or cooling in accordance with the temperature of the passenger compartment.

The present invention is directed to a bidirectional control circuit employing transistors of an opposite conductivity type that control the direction of current flow through an electrical device such as a motor in accordance with an input signal. A system of this general type is illustrated in the Brannan Patent 2,875,391, which discloses a direct current motor the direction of rotation of which is controlled by a pair of transistors. The Brannan system, however, has certain disadvantages in that it requires at least two batteries for operation of the motor and the power that is available to drive the motor is limited by the voltage and current capacity of the batteries.

In contrast to the system described in the Brannan patent, it is an object of this invention to provide a bidirectional motor control system employing transistors of opposite conductivity type and wherein the current for driving the motor is derived from the normal storage battery available on a motor vehicle. In a system of this invention only a single battery is required for operating the motor and means are provided for stepping up the voltage available to drive the motor.

Another object of this invention is to provide a motor control system including a pair of transistors of opposite conductivity type which control the current flow through the motor, the current supplied to the transistors including a device for inverting the voltage of a direct current source to alternating current which is stepped up through a transformer and rectified for use in driving the motor.

Still another object of this invention is to provide a bidirectional motor control circuit that includes a pair of transistors of opposite conductivity type and a pair of rectifiers connected with said transistors for supplying half-wave direct current to said transistors from a source of A.C. voltage.

A further object of this invention is to provide a bidirectional motor control circuit employing transistors of opposite conductivity type and wherein the power supplied to the motor is of a pulsating D.C. type that is derived through rectifiers connected with the secondary winding of a transformer and further, wherein the primary winding of the transformer is connected in a transistor oscillator circuit.

Further objects and advantages of the present invention will be apparent from the following description, reference being had to the accompanying drawings wherein a preferred embodiment of the present invention is clearly shown.

In the drawings, the single FIGURE drawing is a circuit diagram of a motor control circuit made in accordance with this invention.

Referring now to the drawing, the reference numeral 10 designates a transistor having a base electrode $b$, an emitter electrode $e$ and a collector electrode $c$. The emitter electrode of the transistor 10 is connected with a junction 12 which is in turn connected to one side of a storage battery 14. In a motor vehicle electrical system the storage battery 14 may be connected with the usual charging circuit for supplying charging current thereto and it is seen that one side of the battery 14 is connected to ground.

A transformer generally designated by reference numeral 16 is provided which has a secondary winding 18, a primary winding 20 and a tertiary winding 24. The winding 24 has one side thereof connected with junction 12 via lead wire 26, whereas the opposite side of winding 24 is connected with the base electrode of transistor 10 through a resistor 28. The primary winding 20 of the transformer is connected between ground and the collector electrode of transistor 10, as is clearly apparent from the drawing.

The reference numeral 30 designates a direct current motor which is energized through the control circuit of this invention. It is seen that one side of the motor 30 is connected with a lead wire 32, whereas the opposite side thereof is connected with lead wire 34. The lead wire 34 is connected with the junction 36 which, in turn, is connected with the emitter electrodes $e$ of transistors 38 and 40. The transistor 38 has a collector electrode $c$ and a base electrode $b$ which is connected with lead wire 42. The transistor 40 has a collector electrode $c$ and a base electrode $b$ which is likewise connected with lead wire 42. The transistor 38 is of the n-p-n type, whereas the transistor 40 is the p-n-p type, as is clearly apparent from the drawings.

The junction 36, which ties together the emitter electrodes of transistors 38 and 40, is connected with a lead wire 44 and is connected with one side of resistors 46 and 48 via the lead wire 34. The opposite sides of resistors 46 and 48 are connected with the base electrodes of transistors 38 and 40 and with the lead wire 42.

A pair of rectifiers 50 and 52 are provided which operate to supply pulsating direct current to the transistors and motor 30 in a manner to be more fully described hereinafter. The rectifier or diode 50 is connected between the lead wires 53 and 54 which are respectively connected to the collector electrode of transistor 38 and one side of the secondary winding 18. The rectifier 52 is connected with junction 56 via lead wire 58 and is connected with the collector electrode of transistor 40 via lead wire 60.

The lead wires 42 and 44 are connected with a voltage signal source designated by reference numeral 62. This voltage signal source has terminals 64 and 66 which periodically change their polarity which, in turn, operates to control the flow of current to the motor 30. This voltage signal source 62 may be a device, for example, which changes the polarity of terminals 64 and 66 in accordance with the temperature sensed in a motor vehicle passenger compartment. The motor 30 may likewise drive some device which varies the heating or cooling of the passenger compartment to thus control the polarity of terminals 64 and 66. In other words, the circuit of this invention may be used in a servo control system, the motor responding to the output voltage of the signal source 62 and the motor rotating in a predetermined direction to change a condition and thus change the voltage appearing at terminals 64 and 66.

In the operation of the control circuit of this invention the coil windings 20 and 24 and the transistor 10 operate as a transistor oscillator for supplying an alternating current voltage which is stepped up in transformer 16 and appears across the lead wires 32 and 54 connected with the secondary winding 18 of the transformer. Assuming that the terminal 64 is positive with respect to terminal 66, the transistor 40 will be biased in such a direction to cause it to conduct from emitter to collector. A current will now be supplied to the motor 30 via a circuit that may be traced from the secondary winding 18 through lead wire 32, through the motor 30, through the lead wire 34, through the emitter to collector circuit of transistor 40, through rectifier 52, through lead wire 58 and thence through lead wire 54 back to an opposite side of the secondary winding 18. It will be appreciated that the current supplied to motor 30 will be of the pulsating D.C. type due to the provision of the rectifier 52 in the circuit. At this time no current is passed through the emitter and collector circuit of transistor 38, since it is biased to its non-conductive state when the lead wire 44 is positive with respect to the lead wire 42.

When the terminal 66 becomes positive with respect to terminal 64, the transistor 38 is biased to its conductive state and the transistor 40 becomes biased to its non-conductive state. Current now will be supplied to the motor 30 via a circuit that may be traced from one side of the secondary winding 18 through lead wire 54, through rectifier 50, through lead wire 53, through the emitter-collector circuit of transistor 38, through lead wire 34 and thence through the motor to the opposite side of secondary winding 18. It can be seen that the direction of current flow through the motor 30 has now been reversed so that the motor will now rotate in an opposite direction. The current supplied to the motor is once more pulsating direct current due to the provision of rectifier 50 connected in circuit with transistor 38.

If the potential of terminals 64 and 66 becomes equal, the motor 30 will not rotate in either direction, since neither the transistors 38 nor 40 will be conductive and the system will be in a balanced condition.

While the embodiment of the present invention as herein disclosed, constitutes a preferred form, it is to be understood that other forms might be adopted.

What is claimed is as follows:

1. In a motor control system, the combination comprising, a direct current motor, a source of A.C. voltage, first and second transistors of opposite conductivity types, a first energizing circuit energizable only on a first half cycle of applied A.C. voltage for said electric motor including said A.C. voltage source, a rectifier and one of said transistors, a second energizing circuit energizable only on the other half cycle of applied A.C. voltage for said electric motor including said A.C. voltage source, a second rectifier and the other of said transistors, and means for causing one of said transistors to become conductive while the other of said transistors is nonconductive.

2. A motor control circuit comprising, a direct current motor, a source of A.C. voltage, a first transistor of the p-n-p type, a second transistor of the n-p-n type, a first energizing circuit for said electric motor including said A.C. voltage source, a rectifier and said p-n-p transistor, a second energizing circuit for said motor including said A.C. voltage source, a second rectifier and said n-p-n transistor, means connecting the emitter electrodes of said transistors together, means connecting the base electrodes of said transistors together, a first resistor permanently connecting the emitter and base electrodes of said first transistor, a second resistor permanently connecting the emitter and base electrodes of said second transistor, and means connected with said emitter and base electrodes for periodically varying the polarities of said electrodes to, in turn, control the conductivity of said transistors.

3. A motor control circuit for controlling the direction of rotation of a direct current motor comprising, a source of A.C. voltage, first and second rectifiers, first and second transistors of opposite conductivity types, a first energizing circuit energizable only on a first half cycle of applied A.C. voltage for said motor including said voltage source, one of said rectifiers and the emitter-collector circuit of one of said transistors, said first rectifier being poled in such a direction as to permit current flow through the transistor in its current conducting direction, a second energizing circuit energizable only on the other half cycle of applied A.C. voltage for said motor including said second rectifier and the emitter-collector circuit of said second transistor, said second rectifier being poled in the same direction as the current conducting direction of said second transistor, a first lead wire connecting the emitter electrodes of said transistor, a second lead wire connecting the base electrodes of said transistor, and means for applying a potential to said lead wires of reversible polarity for causing said transistors to be alternately conductive to thereby control the direction of current flow in said motor.

4. In a motor control system, the combination comprising, a storage battery, a direct current motor, first and second transistors of opposite conductivity types, means for inverting the voltage of said storage battery to an A.C. voltage, a first energizing circuit energizable only on a first half cycle of applied A.C. voltage for said motor including a first rectifier, said source of A.C. voltage and said first transistor, a second energizing circuit energizable only on the other half cycle of applied A.C. voltage for said motor including a second rectifier, said second transistor and said source of A.C. voltage, means connecting the emitter electrodes of said transistors to a first common lead, means connecting the base electrodes of said transistors to a second common lead, and means for varying the potential of said first lead with respect to said second lead to thereby cause alternate conduction of said transistors.

5. A motor control circuit comprising, a source of A.C. voltage including a storage battery and a transistor oscillator connected with transformer means having a winding that forms the source of A.C. voltage, a direct current motor, first and second rectifiers, first and second transistors of opposite conductivity types, a first energizing circuit energizable only on a first half cycle of applied A.C. voltage for said electric motor including said first rectifier, said winding and said first transistor, a second energizing circuit energizable only on the other half cycle of applied A.C. voltage for said motor including said winding, said second rectifier and said second transistor, a first lead wire connected with the emitter electrodes of said transistor, a second lead wire connected with the base electrodes of said transistors, and means for varying the potential of said first lead wire with respect to said second lead wire to thereby cause said transistors to become alternately conductive to control the direction of current flow through said motor.

References Cited in the file of this patent

UNITED STATES PATENTS

| 2,826,731 | Paynter | Mar. 11, 1958 |
| 2,846,581 | Volkers | Aug. 5, 1958 |
| 2,875,391 | Brannan | Feb. 24, 1959 |